United States Patent [19]

Bert

[11] Patent Number: 5,146,943

[45] Date of Patent: Sep. 15, 1992

[54] APPARATUS FOR CONTROLLING THE FLOW OF A PROCESS FLUID INTO A PROCESS VESSEL

[75] Inventor: David R. Bert, Bakersfield, Calif.

[73] Assignee: Mobil Oil Corporation, Fairfax, Va.

[21] Appl. No.: 826,497

[22] Filed: Jan. 27, 1992

[51] Int. Cl.⁵ .............................................. F16K 17/40
[52] U.S. Cl. ...................................... 137/87; 137/68.1
[58] Field of Search ................... 137/67, 68.1, 71, 87, 137/102

[56] References Cited

U.S. PATENT DOCUMENTS

| 762,085 | 6/1904 | Ploppert | 137/87 |
|---|---|---|---|
| 1,280,259 | 10/1918 | Lupinski | 137/68.1 X |
| 1,872,368 | 8/1932 | Vanhom | 137/68.1 |
| 1,924,563 | 8/1933 | Lucke | 137/87 X |
| 2,395,357 | 2/1946 | Trawick | 137/87 X |
| 3,023,765 | 3/1962 | Gresko | 137/87 X |

Primary Examiner—John Rivell
Attorney, Agent, or Firm—Alexander J. McKillop; Charles J. Speciale; L. G. Wise

[57] ABSTRACT

A process vessel has an inlet for receiving a process fluid and an outlet for exhausting process fluid into the atmosphere should the pressure within the vessel exceed a preset limit. A pneumatic safety device positioned within such inlet shuts down the flow of process fluid into the process vessel when actuated pneumatically. A pressure-relieving device positioned within such outlet exhausts process gas into the atmosphere when the pressure within the process vessel exceeds the preset limit as established by the burst pressure level of the pressure relieving device. A pneumatic control link connects the pressure-relieving device to the pneumatic safety device. Such control link actuates the pneumatic safety device to shut-down the flow of process fluid into the process vessel in response to the exhausting of process fluid from the process vessel into the atmosphere.

12 Claims, 3 Drawing Sheets

APPARATUS FOR CONTROLLING THE FLOW OF A PROCESS FLUID INTO A PROCESS VESSEL

BACKGROUND OF THE INVENTION

Process vessels handling natural gas, natural gas liquids, refinery products, water, chemicals, or other fluids are often outfitted with a safety shut-down device and a burst pressure relieving device as shown in FIG. 1. A typical safety shut-down device for a process vessel 10 consists of a pneumatic shut-down valve 11, monitor pilots 12, and supply gas control system 13. An additional pressure safety device includes a standard burst pressure relieving device 14, such as a relief (pop-off) valve or rupture disk to protect against excessive burst pressures and catastrophic failure. It is not uncommon for a rupture disk to break due to rapid pressure change, metal fatigue, or environmental factors. A relief valve may not function properly due to incorrect set-points, poor sensitivity, mechanical failure, or environmental factors. The safety valve 11 is a normally-closed valve which is held open by supply gas pressure (normally 20–60 psig). A monitor pilot 12 is located on the upstream and/or downstream process piping to sense pipeline pressure. If the monitor pilot set-points are exceeded, the pilot is designed to exhaust control pressure from the supply line. This causes a block and bleed relay valve 13 to block incoming supply gas pressure and bleed remaining pressure from the supply gas line through a pneumatic control system tubing 15 (shown in dashed line) containing low pressure supply gas. When the supply gas pressure is bled down (i.e. supply gas pressure decreases from the normal 20–60 psig to atmospheric pressure), the pneumatic safety valve closes. The monitor pilot has a manual reset feature which allows the inlet flow stream to resume when the shut-down event has been corrected.

However, one of the problems with the foregoing described system is that the burst-relieving device operates on a stand-alone basis. This can cause an environmental impact to be felt due to discharge of the pressure vessel contents into the atmosphere through the burst-relieving device before the inlet flow into the vessel can be shut off, especially in the event of a burst-relieving device failure. It is therefore a specific object of the present invention to overcome such a problem by automatically linking, either pneumatically or electronically, the operation of the burst relief valve to the operation of the safety shut-down device.

SUMMARY OF THE INVENTION

The present invention is directed to apparatus for controlling the flow of a process fluid into a process vessel. More particularly, the process vessel includes an inlet for receiving process fluid and an outlet for exhausting process fluid into the atmosphere should the pressure within the process vessel exceed a preset limit. A pneumatic safety device is positioned within the inlet for shutting down the flow of process fluid into the process vessel when actuated pneumatically. A pressure-relieving device such as a rupture disk or relief valve, is positioned within the outlet for exhausting process fluid into the atmosphere when the pressure within the process vessel exceeds a preset limit established by a burst pressure level of the pressure-relieving device. A pneumatic control link connects the pressure-relieving device to the pneumatic safety device and actuates the pneumatic safety device to shut-down the flow of process fluid into the process vessel in response to the exhausting of process fluid through the outlet of the process vessel into the atmosphere.

In one aspect, the pneumatic control link includes a movable member having a first position covering the outlet of the process vessel and which is movable to a second position away from the outlet by the exhausting of process fluid from the process vessel. The pneumatic control link operates the pneumatic safety device to shut down the flow of process fluid by the bleeding into the atmosphere of a supply gas to the pneumatic control link in response to the movement of the movable member from such first position to such second position.

In another aspect, the pneumatic control link includes a tubing positioned over the outlet of the process vessel which is ruptured by the exhausting of process fluid from the process vessel. The pneumatic control link operates the pneumatic safety device to shut-down the flow of process fluid by the bleeding into the atmosphere through the ruptured tubing of a supply gas to the pneumatic control link.

In a still further aspect, the pressure-relieving device includes a pair of rupture disks positioned within the outlet of the process vessel and a pneumatic control link connected to the outlet between the pair of rupture disks. The rupture disk positioned farthest away from the process vessel has a lower burst pressure level than the other rupture disk but greater than the supply gas pressure to the control link. Therefore, the supply gas bleeds off into the atmosphere when process fluid is exhausted from the pressure vessel into the atmosphere by the pressure within the process vessel exceeding the burst pressure levels of both rupture disks. Whereby, the pneumatic safety device is actuated to shut-down the flow of process fluid into the process vessel.

In a still further aspect, the pneumatic control link includes a fluid flow switch connected to the outlet of the process vessel for generating an electrical signal in response to the exhausting of process fluid through the outlet into the atmosphere. A solenoid converts the electrical signal into a pneumatic control signal. Means provided for bleeding the supply gas to the pneumatic control link into the atmosphere in response to the pneumatic control signal. The pneumatic safety device is actuated by the bleeding of the supply gas into the atmosphere to shut-down the flow of process fluid into the process vessel.

DESCRIPTION OF THE PREFERRED EMBODIMENT

In accordance with the present invention, there is provided a safety shut-down control system loop for pneumatically or electronically linking a burst pressure relieving device, such as a rupture disk or a relief valve, on a pressure vessel to a safety shut-down device, or valve, so that the safety shut-down device is actuated whenever the burst-relieving device is actuated or fails.

Figure 1:
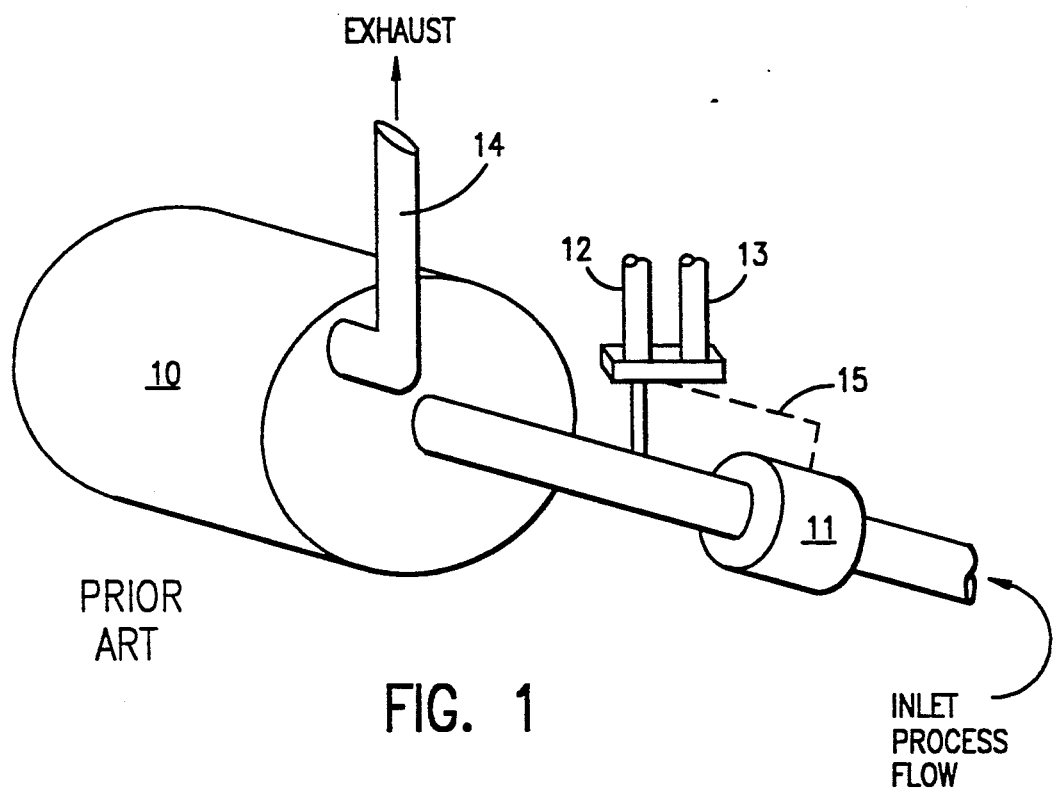
FIG. 1 illustrates a typical pneumatic safety shut-down system of the prior art for the flow of process fluid into a process vessel.
Figure 2:
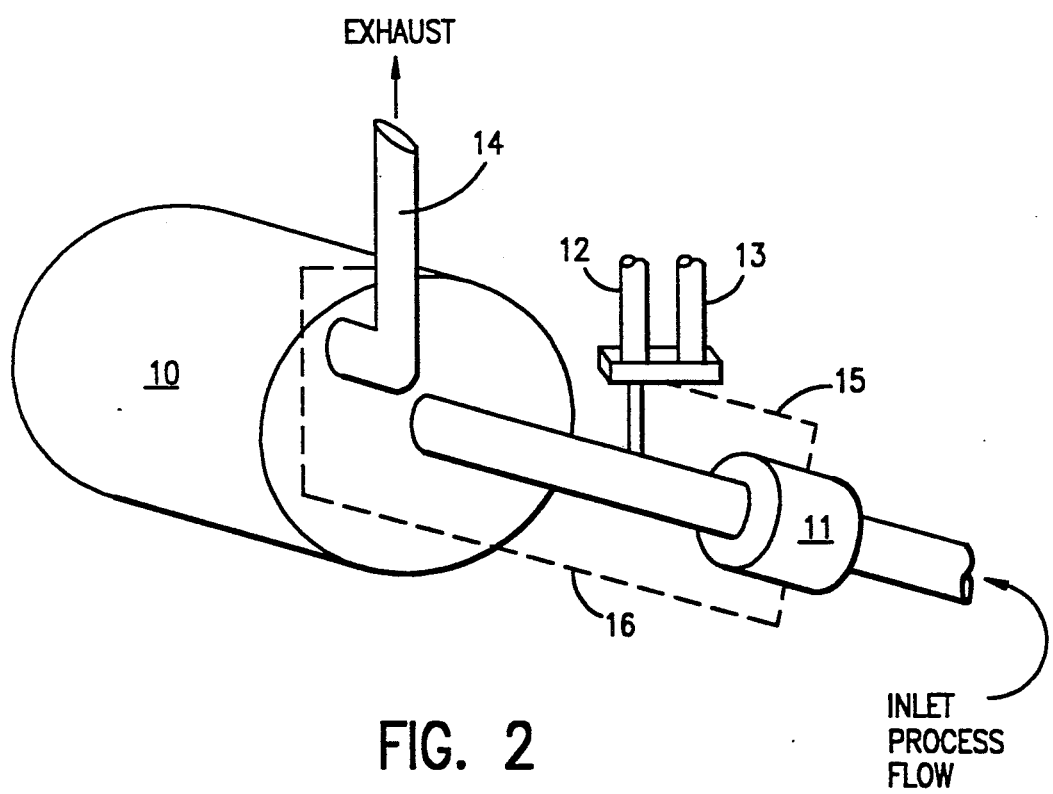
FIG. 2 illustrates the pneumatic safety shut-down system of the present invention for the flow of process fluid into a process vessel.
Figure 3:
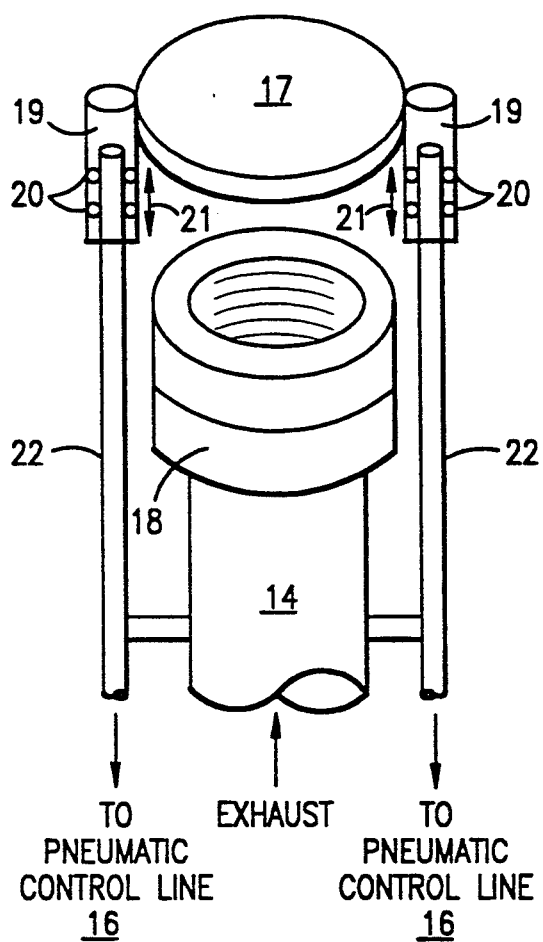
FIGS. 3–6 illustrate various alternate embodiments of apparatus for use in the pneumatic safety shut-down system of FIG. 2.

Referring now to FIG. 2, there is illustrated the present invention of linking the burst pressure relieving device 14, either a rupture disk or relief valve, to the safety shut-down device 11 by a pneumatic, or supply gas, control line 16 (shown in dashed line) for automatically actuating the safety shut-down device 11 in response to actuation or failure of the burst pressure-relieving device 14. The pneumatic control line 16 can be connected to the burst pressure-relieving device 14 alternately as shown in FIGS. 3–6. Referring first to FIG. 3, the pneumatic control line 16 connects to a pair of control line tubings 22 which in turn are connected to a snap-on protective plate 17 for fitting over the exhaust of the burst pressure-relieving device such as a rupture disk 18, for example. This connection is made by snap-on fasteners 19 and O-rings 20. The protective plate 17 will sit loosely on top of the rupture disk 18. The force of rupturing disk, or discharge from the pressure vessel 10, will lift the cover up and away from the rupture disk 18. The snap-on fasteners 19 thus break free and release from the stationary pneumatic control line tubes 22, as shown by the double-headed arrows 21. The supply gas in the pneumatic control line 16 bleeds off into the atmosphere, in turn causing pneumatic safety shut-down device 11 to be actuated, to stop the fluid flow into the pressure vessel 10. The control line pressure cannot be restored until the rupture disk 18 is replaced. The continued discharge of process fluid from the pressure vessel 10 into the atmosphere is thereby prevented.

Figure 4:
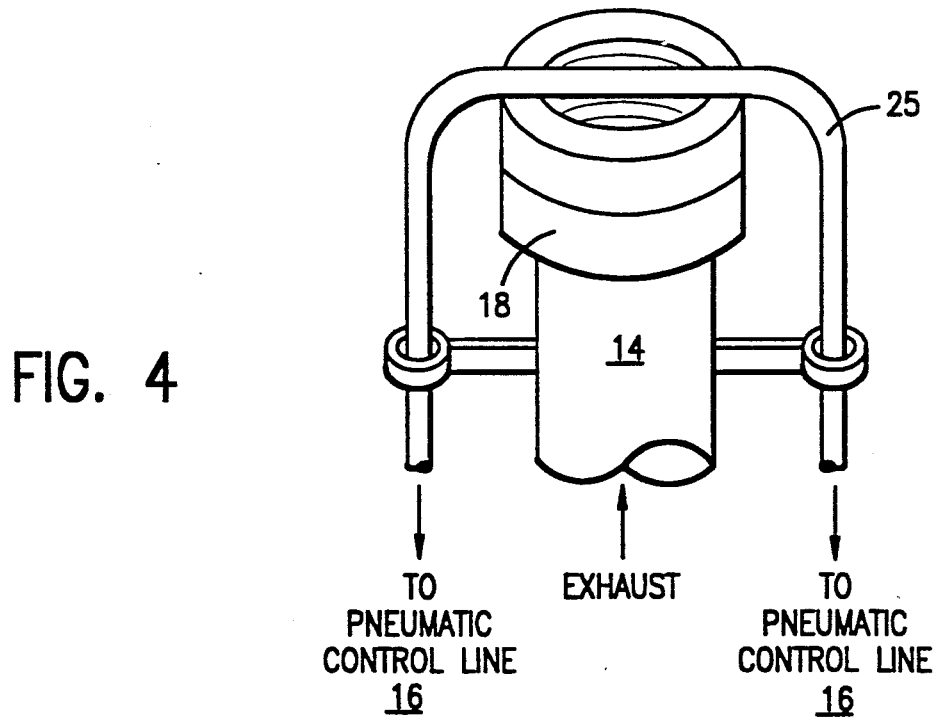

Alternatively, the pneumatic control line 16 of FIG. 2 may be connected to the burst pressure-relieving device 14 by the configuration illustrated in FIG. 4. A plastic tubing 25 is laid over the top of the burst pressure-relieving device, such as the rupture disk 18, and is connected (not shown) to the pneumatic control line 16 When the rupture disk 18 blows, the plastic control tubing 25 is ruptured from the high pressure process fluid discharge from the pressure vessel 10. This rupture allows the supply gas in the pneumatic control line 16 to bleed off into the atmosphere, thereby causing the safety shut-down device to be actuated or closed, to stop fluid flow into the pressure vessel 10. The control line pressure cannot be restored until the plastic control tubing 25 is replaced. The continued discharge of process fluid from the pressure vessel 10 into the atmosphere is thereby prevented.

Figure 5:
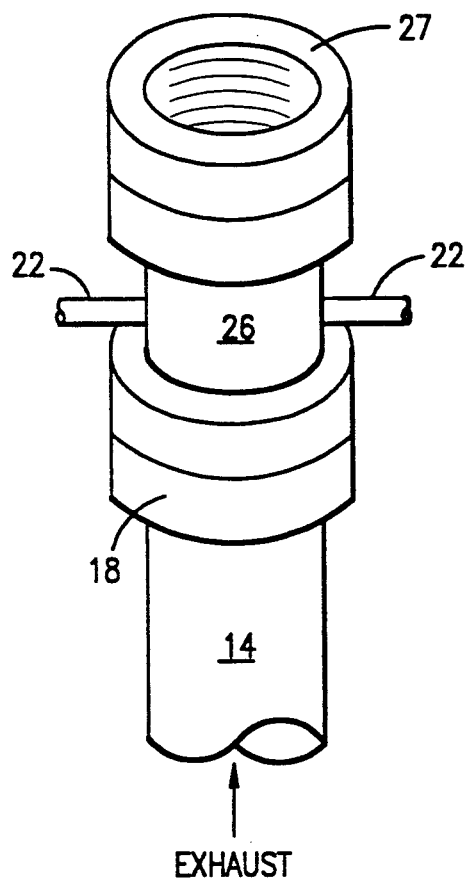

In a still further embodiment as shown in FIG. 5, the pair of control line tubings 22 are connected to a swedge 26 positioned between the rupture disk 18 and a second rupture disk 27. Such a dual rupture disk assembly is particularly applicable to pressure vessels with low to medium operating pressures (75 to 400 psig for example). The rupture disk 27 has a lower pressure rating than rupture disk 18 but is slightly greater than the pneumatic control line pressure. The two rupture disks create a small chamber inside the bowl of the swedge 26. In the event the rupture disks 18 and 27 burst, the control line pressure will bleed off into the atmosphere, again causing the pneumatic safety shut-down device to be actuated as described hereinabove. The primary rupture disk design conditions must be slightly derated because of the pneumatic system's supply gas pressure acting above the rupture disk 18. Using a 40 psig supply gas pressure as an example, it would require about 1,040 psig to burst a 1,000 psi rated rupture disk 18. Also the bleed-off rate of the control line pressure will be affected by the high pressure of the process fluid exhaust from the pressure vessel 10.

Figure 6:
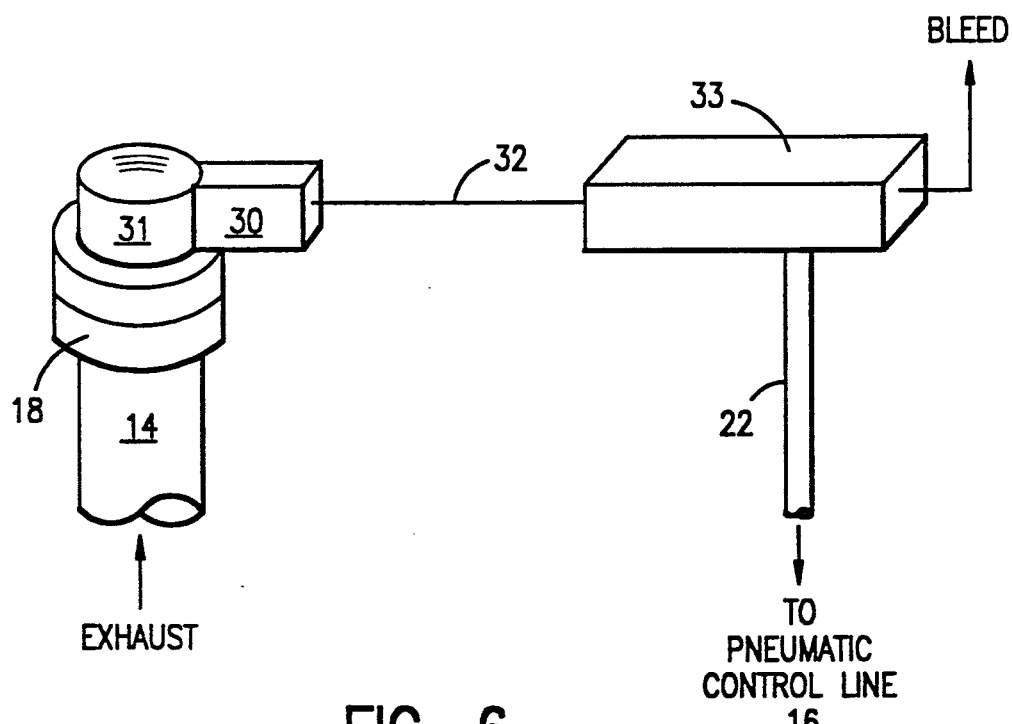

In a yet further embodiment shown in FIG. 6, a flow switch 30 is attached to an outlet 31 at the top of the rupture disk 18. When the rupture disk 18 fails, the flow switch 30 senses the process fluid exhaust flow through the rupture disk 18 and sends an electrical signal over line 32 to a solenoid 33. The solenoid 33 converts the electrical signal to a pneumatic control signal which activates a block and bleed valve to bleed the supply gas in the pneumatic control line system from the control line tubing 22 into the atmosphere. As the control line system is bled into the atmosphere, the pneumatic safety shut-down device is activated, or closed, to shut-down the flow of process fluid into the pressure vessel 10.

Having now described the apparatus of the present invention, it is to be understood that various modifications and changes may be made to such apparatus without departing from the spirit and scope of the invention as set forth in the appended claims.

We claim:

1. Apparatus for controlling the flow of a process fluid into a process vessel, comprising:
    a) a process vessel having an inlet for receiving a process fluid and an outlet for exhausting process fluid into the atmosphere should the pressure within said process vessel exceed a preset limit,
    b) a pneumatic safety device positioned within said inlet for shutting down the flow of process fluid into said process vessel when actuated pneumatically,
    c) a pressure-relieving device positioned within said outlet for exhausting process fluid from said process vessel into the atmosphere when the pressure within said process vessel exceeds said preset limit as established by a burst pressure level of said pressure-relieving device, and
    d) a pneumatic control link connecting said pressure-relieving device to said pneumatic safety device, said pneumatic control link actuating said pneumatic safety device to shut-down the flow of process fluid into said process vessel in response to the exhausting of said process fluid through said outlet into the atmosphere.

2. The apparatus of claim 1 wherein said pressure-relieving device is closed when the pressure within said process vessel is below the burst pressure level of said pressure-relieving device, is opened by the pressure within said process vessel exceeding said burst pressure level, and remains opened following the exceeding of said burst pressure level by the pressure within the process vessel until it is closed.

3. The apparatus of claim 1 wherein said pressure-relieving device includes a rupture disk.

4. The apparatus of claim 1 wherein said pressure-relieving device is a relief valve.

5. The apparatus of claim 1 wherein said pneumatic control link includes a movable member having a first position covering said outlet and movable to a second position away from said outlet by the exhausting of process fluid from said process vessel.

6. The apparatus of claim 5 wherein said control link pneumatically operates said pneumatic safety device to shut-down the process fluid flow into said process vessel in response to the movement of said movable member from said first position to said second position.

7. The apparatus of claim 6 wherein said movable member is a plate covering said outlet.

8. The apparatus of claim 6 wherein said pneumatic control link operates said pneumatic safety device by the bleeding into the atmosphere of a supply gas to said pneumatic control link in response to the movement of said movable member from said first position to said second position.

9. The apparatus of claim 1 wherein said pneumatic control link includes a tubing positioned over said outlet which is ruptured by the exhausting of process fluid from said process vessel.

10. The apparatus of claim 9 wherein said pneumatic control link operates said pneumatic safety device by the bleeding into the atmosphere through said ruptured tubing of a supply gas to said pneumatic control link.

11. The apparatus of claim 3 wherein said pressure relieving device comprises:
   a) a first rupture disk positioned within said outlet,
   b) a second rupture disk positioned within said outlet between said first rupture disk and said process vessel,
   c) said pneumatic control link is connected to said outlet between said first and second rupture disks,
   d) said first rupture disk having a lower burst pressure level than said second rupture disk but greater than a supply gas pressure to said control link, whereby the supply gas to said control link bleeds off into the atmosphere when process fluid is exhausted from said pressure vessel into the atmosphere by the pressure within said vessel exceeding the burst pressure level of both said first and second rupture disks, thereby actuating said pneumatic safety device to shut-down the flow of process fluid into said process vessel.

12. The apparatus of claim 1 wherein said pneumatic control link comprises:
   a) a fluid flow switch connected to said outlet for generating an electrical signal in response to the exhausting of said process fluid through said outlet into the atmosphere,
   b) a solenoid for converting said electrical signal into a pneumatic control signal, and
   c) means responsive to said pneumatic control signal for bleeding a supply gas to said pneumatic control link into the atmosphere, said pneumatic safety device being actuated by the bleeding of said supply gas into the atmosphere to shut-down the flow of process fluid into the process vessel.

* * * * *